(12) United States Patent
Ohta et al.

(10) Patent No.: US 6,859,149 B1
(45) Date of Patent: *Feb. 22, 2005

(54) VEHICLE INFORMATION DISPLAY APPARATUS

(75) Inventors: Masako Ohta, Tokyo (JP); Tatsuy Mitsugi, Tokyo (JP); Kei Gomita, Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1135 days.

(21) Appl. No.: 09/002,927

(22) Filed: Jan. 5, 1998

(30) Foreign Application Priority Data

Apr. 22, 1997 (JP) .............................................. 9-104700

(51) Int. Cl.⁷ ............................................... G08G 1/123
(52) U.S. Cl. .................... 340/990; 340/992; 340/995.1; 340/995.12; 340/988
(58) Field of Search ................................ 340/990, 991, 340/992, 993, 995.1, 988, 989, 995.13, 995.12, 995.17

(56) References Cited

U.S. PATENT DOCUMENTS

| | | | | |
|---|---|---|---|---|
| 5,131,020 A | * | 7/1992 | Liebesny et al. | 379/59 |
| 5,204,817 A | * | 4/1993 | Yoshida | 364/449 |
| 5,243,528 A | * | 9/1993 | Lefebvre | 364/449 |
| 5,257,023 A | * | 10/1993 | Furuya | 340/995 |
| 5,383,128 A | * | 1/1995 | Nishida et al. | 364/449 |
| 5,404,443 A | * | 4/1995 | Hirata | 395/161 |
| 5,412,573 A | * | 5/1995 | Barnea et al. | 364/449 |
| 5,442,557 A | * | 8/1995 | Kaneko | 364/449 |
| 5,541,592 A | * | 7/1996 | Shiihara | 340/990 |
| 5,559,511 A | * | 9/1996 | Ito et al. | 340/995 |
| 5,583,494 A | | 12/1996 | Mizutani et al. | 340/995 |
| 5,614,898 A | * | 3/1997 | Kamiya et al. | 340/995 |
| 5,636,122 A | * | 6/1997 | Shah et al. | 364/449.1 |
| 5,638,279 A | * | 6/1997 | Kishi et al. | 364/443 |
| 5,729,731 A | * | 3/1998 | Yajima et al. | 395/603 |
| 5,739,772 A | * | 4/1998 | Nanba et al. | 340/990 |
| 5,757,290 A | * | 5/1998 | Watanabe et al. | 340/995 |
| 5,758,313 A | * | 5/1998 | Shah et al. | 701/208 |
| 5,774,073 A | * | 6/1998 | Maekawa et al. | 340/995 |
| 5,831,552 A | * | 11/1998 | Sogawa et al. | 340/995 |
| 5,842,147 A | * | 11/1998 | Nimura et al. | 701/211 |
| 5,874,905 A | * | 2/1999 | Nanba et al. | 340/995 |

FOREIGN PATENT DOCUMENTS

| | | |
|---|---|---|
| CN | 1124858 A | 6/1996 |
| JP | 4-195400 | 7/1992 |
| JP | 6-229768 | 8/1994 |
| JP | 06243394 | 9/1994 |
| JP | 07129895 | 5/1995 |
| JP | 7-168997 | 7/1995 |
| JP | 8-338736 A | 12/1996 |
| JP | 8-339492 A | 12/1996 |
| JP | 10-1998-0005693 | 4/2000 |

OTHER PUBLICATIONS

Sugimoto, H. et al: "Development of Toyota in–vehicle equipments for the VICS demonstration test", 1994 Vehicle Navigation and Information Systems Conference Proceedings, Yokohama, Japan, Aug. 31–Sep. 2, 1994, New York, NY, USA, IEEE, USA, pp. 563–568.

Patent Abstracts of Japan vol. 1995, No. 10, Nov. 30, 1995 & JP 07 168997 A (Alpine Electron Inc), Jul. 4, 1995 *abstract*.

* cited by examiner

Primary Examiner—Toan N. Pham
(74) Attorney, Agent, or Firm—Sughrue Mion, PLLC

(57) ABSTRACT

A vehicle information display device has a vehicle information receiving means for receiving a vehicle information, a present position detecting means for detecting the present position of a driver's own vehicle, and a display means which is so adapted that when the vehicle information receiving means receives a vehicle information based on image data, the vehicle information based on image data is displayed, and the present position of the driver's own vehicle is displayed by means of characters or a present position indicating mark on a displayed map.

13 Claims, 13 Drawing Sheets

VEHICLE INFORMATION DISPLAY APPARATUS

BACKGROUND OF THE INVENTION

1. Field of the Invention

The present invention relates to a vehicle information display apparatus for displaying a received vehicle information on a map displayed in a display region, a method of displaying a vehicle information, and a medium in which a program for controlling a display for the vehicle information display apparatus is recorded.

2. Discussion of Background

There have been invented vehicle information systems to obtain smooth cruising of vehicles. Now, vehicle informations such as a traffic stagnation, a traffic accident or a traveling time have been presented to vehicles through various kinds of media. In such a case, there have been proposed various ways of presenting vehicle information data by means of, for example, a character information presented as JIS (Japanese Industrial Standard) KANJI (Chinese character) and KANA (Japanese character) code, a figure information presented by means of image data and a link information wherein link numbers are given to respective roads and various kinds of information are presented by using the link numbers.

FIG. 11 shows a display region in which a character information is displayed; FIG. 12 shows a display region in which a figure information is displayed, and FIG. 13 shows a display region indicating a map to which roads in correspondence with a link information are added.

Detailed explanation will be made as to a conventional method of displaying various kinds of information with use of these drawings.

The character information comprises a heading section indicating a kind of information and a time at which the information is presented and an actual information section for displaying detailed information, which are supplied by means of the JIS KANJI and KANA code. When a character information is received, an image as shown in FIG. 11 is presented. In an upper portion of the display region, there are shown the name of a medium received (in this case, a radio beacon provides "broad area character information") and an information receiving time (in this case, "12:56").

The figure information comprises a background picture data which are provided as a simplified map including road names, road numbers and place names, the simplified map being previously prepared and a superimposing picture data which are so adapted as to be superimposed correctly on the background picture data after the received vehicle information has been processed. Since the background picture data and the superimposing picture data are image data, the display means on the vehicle displays the data without any change. When a figure information is received, an image as shown in FIG. 12 is displayed wherein the name of a medium received (in this case, an FM multiplex broadcast informs "accident-regulation") and an information receiving time (in this case, "15:30") are indicated.

A link information is composed of a link code indicating link numbers which are previously given to respective roads and an information code which includes various kinds of vehicle information corresponding to the link (such as a traffic stagnation information, a travel time, a traffic regulation, a parking information and so on) and additional informations related thereto. For example, there are 4 kinds of the stagnation information, i.e., "stagnation", "crowd", "no stagnation" and "unclear", and there are 5 kinds of the parking information, i.e., "occupied", "crowd", "empty", "closed" and "unclear".

Further, as shown in FIG. 13, a display can be shown by superimposing various kinds of vehicle information on an image of the ordinary map.

Thus, with respect to the character information, the driver or a passenger in the driver's own vehicle can optionally determine the way of displaying characters (for example, the size, the color and the type of characters, an arrangement of characters and so on). Further, since the map information itself is previously set in the driver's own vehicle, the driver or the passenger can determine the way of displaying the map (for example, a reduced scale and a magnification of the map), and a combination of the character information and the figure information can be displayed as a link information as shown in FIG. 14.

However, the conventional vehicle information display apparatus had a problem as follows. Since the figure information was supplied as image data by a predetermined number of dots, it was impossible to change the figure information at the driver's vehicle side, and it was impossible to combine the figure information with another information.

Further, although it was possible to recognize traffic stagnations at several places by means of the figure information, the present position of the driver's vehicle could not be displayed by the figure information so that the driver could not detect the location where the driver's vehicle cruises. As a result, the positional relation between a vehicle information such as a traffic stagnation and the driver's own vehicle could not be recognized. Further, even in a combination of the character information with the map, the driver had to detect the present position of the owner vehicle in view of the present position indicating mark on the displayed map. Accordingly, he could not obtain an effective information such as the name of a place which can easily be related to the character information. Thus, the driver could not detect the positional relation between the character information and the present position.

SUMMARY OF THE INVENTION

It is an object of the present invention to provide a vehicle information display apparatus which allows the driver in a driver's own vehicle to detect a state of stagnation and so on at related places by means of a vehicle information such as a figure information which is easy to see and which allows the driver to detect the present position of his own vehicle by means of a map information.

In accordance with the present invention, there is provided a vehicle information display device which comprises a vehicle information receiving means for receiving a vehicle information, a present position detecting means for detecting the present position of a driver's own vehicle, and a display means which is so adapted that when the vehicle information receiving means receives a vehicle information based on image data, the vehicle information based on image data is displayed, and the present position of the driver's own vehicle is displayed by means of characters or a present position indicating mark on a display map.

In accordance with the present invention, there is provided a vehicle information display device which comprises a vehicle information receiving means for receiving a vehicle information, a present position detecting means for detecting the present position of a driver's own vehicle, and a display means which is so adapted that when the vehicle information receiving means receives a vehicle information based on image data, the vehicle information based on image data is displayed on a part of a display region and a map is displayed on another part of the display region, and the present position of the driver's own vehicle detected by the present position detecting means is displayed on the map.

In accordance with the present invention, there is provided a vehicle information display device which comprises a vehicle information receiving means for receiving a vehicle information, a present position detecting means for detecting the present position of a driver's own vehicle, and a display means which is so adapted that when the vehicle information receiving means receives a vehicle information based on character data, the vehicle information based on character data is displayed, and the present position of the driver's own vehicle is displayed by means of characters.

In accordance with the present invention, there is provided a vehicle information display device which comprises a vehicle information receiving means for receiving a vehicle information, a present position detecting means for detecting the present position of a driver's own vehicle, and a display means which is so adapted that when the vehicle information receiving means receives a vehicle information based on image data which are constituted by prescribed background data and vehicle information data, a simplified map based on the background data and the vehicle information is displayed, and the present position of the driver's own vehicle is displayed on the simplified map on the basis of positional data which are stored in correspondence with the prescribed background data.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
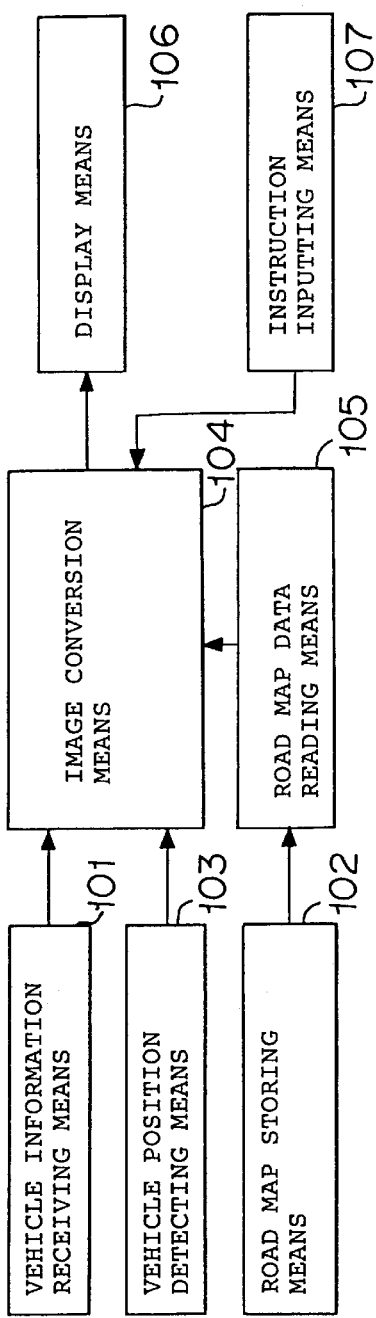
FIG. 1 is a block diagram showing the functional structure of a vehicle information display apparatus according to a first embodiment of the present invention.

Preferred embodiments of the present invention will be described in more detail with reference to the drawings wherein the same reference numerals designate the same or corresponding parts.

Figure 2:
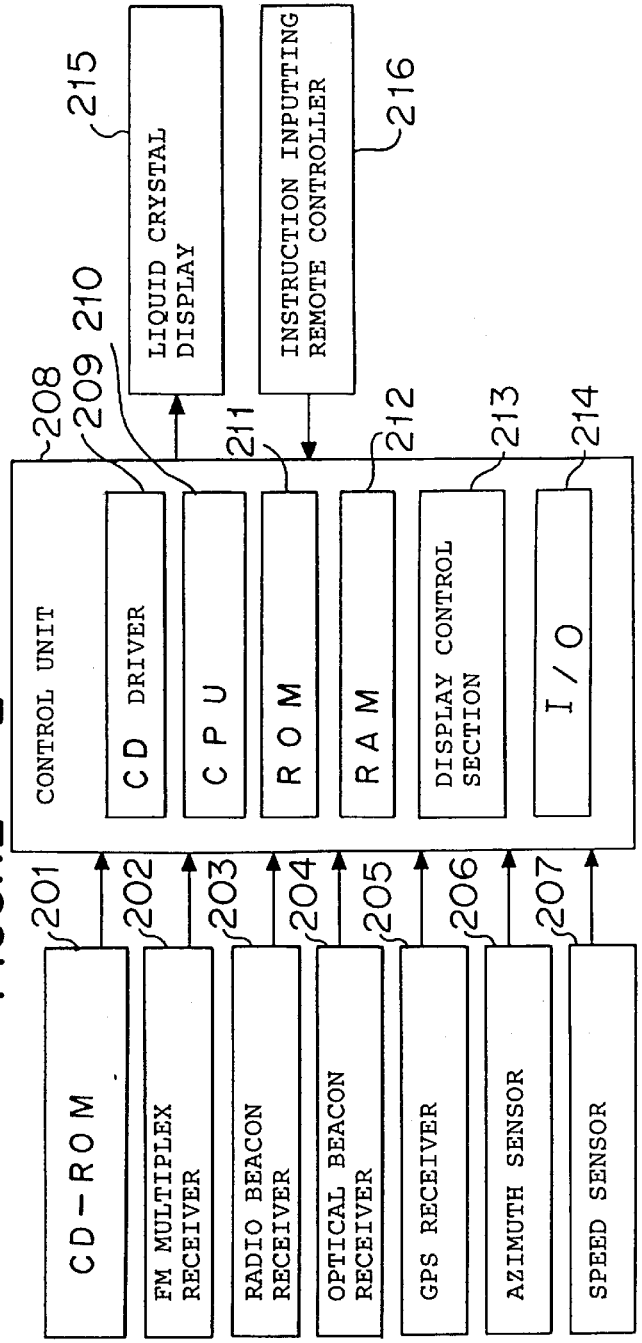
FIG. 2 is a block diagram showing an example of the hardware of the vehicle information display apparatus according to the first embodiment of the present invention.
Figure 3:
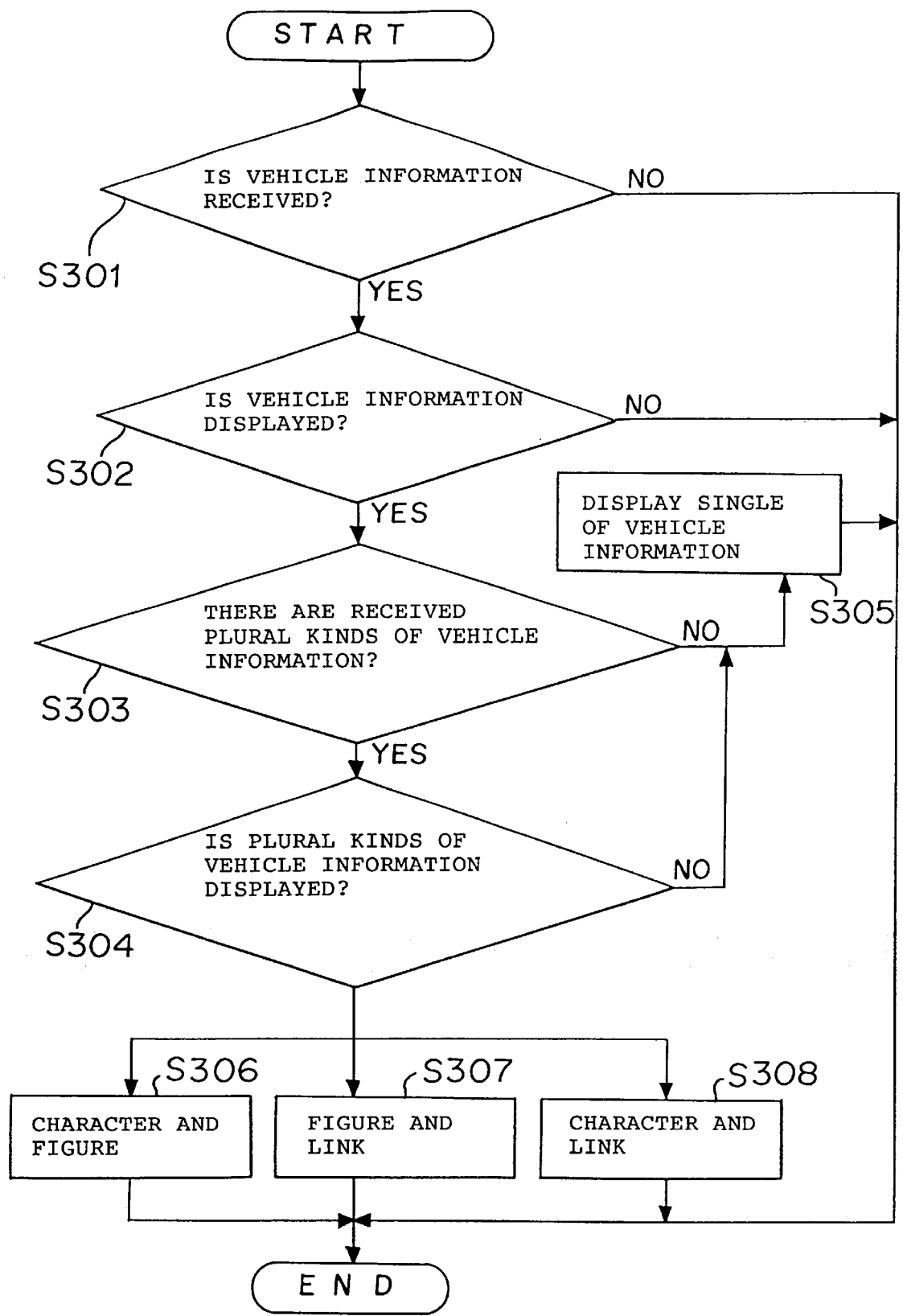
FIG. 3 is a flowchart showing a flow of processing in the vehicle information display apparatus according to the first embodiment of the present invention.

FIG. 1 is a block diagram showing the vehicle information display apparatus of the first embodiment of the present invention; FIG. 2 is a block diagram showing an example of the hardware of the display apparatus; FIG. 3 is a flowchart showing a flow of processing in the display apparatus, and FIGS. 4 to 6 and 8 to 10 are respectively examples of display regions.

In FIG. 1, reference numeral 101 designates a vehicle information receiving means such as an FM signal receiver for receiving various kinds of vehicle information such as a traffic stagnation, a traffic regulation and so on which are supplied through FM multiplex broadcasting stations or the like, or a beacon receiver for receiving such vehicle information from beacon transmitters installed at road sites, numeral 102 designates a road map data storing means as a medium such as CD-ROM or a memory which stores road map data such as a road information, a value-added information and so on. It is possible that a display controlling program for the vehicle information display apparatus is recorded in CD-ROM, a memory card or the like, and recorded data of the display controlling program are read out so that the display controlling program is proceeded by an image conversion means (which will be described later).

Reference numeral 103 designates a vehicle position detecting means which can measure the present position by using an autonomous navigation technique wherein the present position of the driver's own vehicle is detected by means of various kinds of sensors such as a gyrosensor, a speed sensor and so on or which can measure the present position by a satellite navigation technique wherein the present position is detected by electric waves from a GPS satellite.

Numeral 104 designates an image conversion means which produces display signals for displaying an image composed of a road map display and a vehicle information display by converting a vehicle information received by the vehicle information receiving means 101 and the road map data stored in the map data storing means 102, numeral 105 designates a road map data reading means for reading from the road map data storing means 102 the road map designated by the image conversion means 104 based on the position of the driver's own vehicle, numeral 106 designates a display means for displaying an image composed of a road map, a vehicle information display and so on in response to display signals from the image conversion means 104, and numeral 107 designates an instruction inputting means used for inputting instructions concerning a destination and selected items.

An example of the hardware of the vehicle information display apparatus of the first embodiment of the present invention will be describe with reference to FIG. 2. In FIG. 2, reference numeral 201 designates CD-ROM (compact disk-read only memory) which operates as, for example, the map data storing means 102 in FIG. 1. Numeral 202 designates an FM multiplex receiver for receiving multiplex broadcasting signals, numeral 203 designates a radio beacon receiver for receiving information signals transmitted from a radio beacon, and numeral 204 designates an optical beacon receiver for receiving information signals transmitted from an optical beacon. Each of these receivers operates as, for example, the vehicle information receiving means 101 in FIG. 1.

Numeral 205 designates a GPS receiver for detecting the position of the driver's own vehicle, numeral 206 designates an azimuth sensor for detecting the azimuth of the owner's vehicle and numeral 207 designates a vehicle speed sensor for detecting a speed of the owner's vehicle wherein these devices operate as, for example, the vehicle position detecting means 103 in FIG. 1. Numeral 208 designates a control unit for effecting various kinds of arithmetic operations and control of the entire system, which is constituted by a CD driver 209, CPU (central processing unit) 210, ROM (read only memory) 211, RAM (random access memory) 212, a display control section 213 for controlling a display in a liquid crystal display 215 (which will be described later), and an I/O (input/output section) 214 which inputs data from the outside and outputs data to the outside.

The control unit 208 also operates as, for example, the image conversion means 104 and the road map data reading means 105 in FIG. 1.

Numeral 215 designates a liquid crystal display which displays display data from the control unit 208 and which operates as, for example, the display means 106 in FIG. 1. Numeral 216 designates an instruction inputting remote controller which operates the content of an image displayed in the liquid crystal display and which controls the control unit 208. The remote controller 216 operates as, for example, the instruction inputting means 107 in FIG. 1.

The operation of the first embodiment of the present invention will be described with reference to the flowchart of FIG. 3.

In S301, determination is made whether or not the vehicle information receiving means 101 receives a vehicle information. In a case of YES, the operation proceeds to S302. In a case of NO, the operation proceeds to END. IN S302, determination is made whether or not the received vehicle information is displayed in the display region of the display means 106 by the image conversion means 104. In a case of YES, the operation proceeds to S303. However, when NO, the operation proceeds to END. In S303, determination is made whether or not there are plural kinds of vehicle information received (in this case, there are a character information, a figure information, and a link information). In a case of YES, the operation proceeds to S304, and when NO, the operation proceeds to S305.

Figure 8:
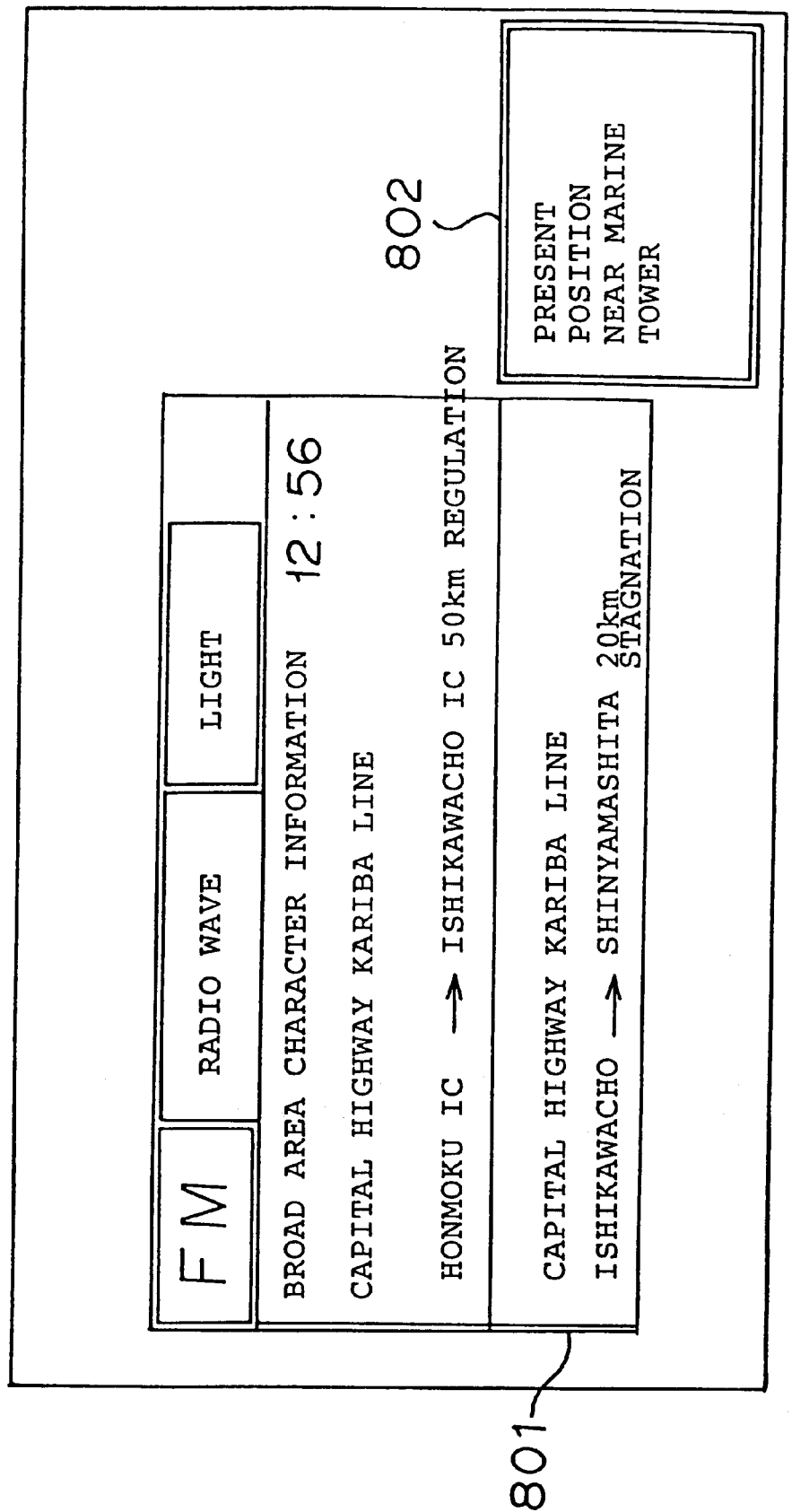
FIG. 8 is a diagram showing an example of the display region of the display means in the vehicle information display apparatus according to the first embodiment of the present invention.
Figure 9:
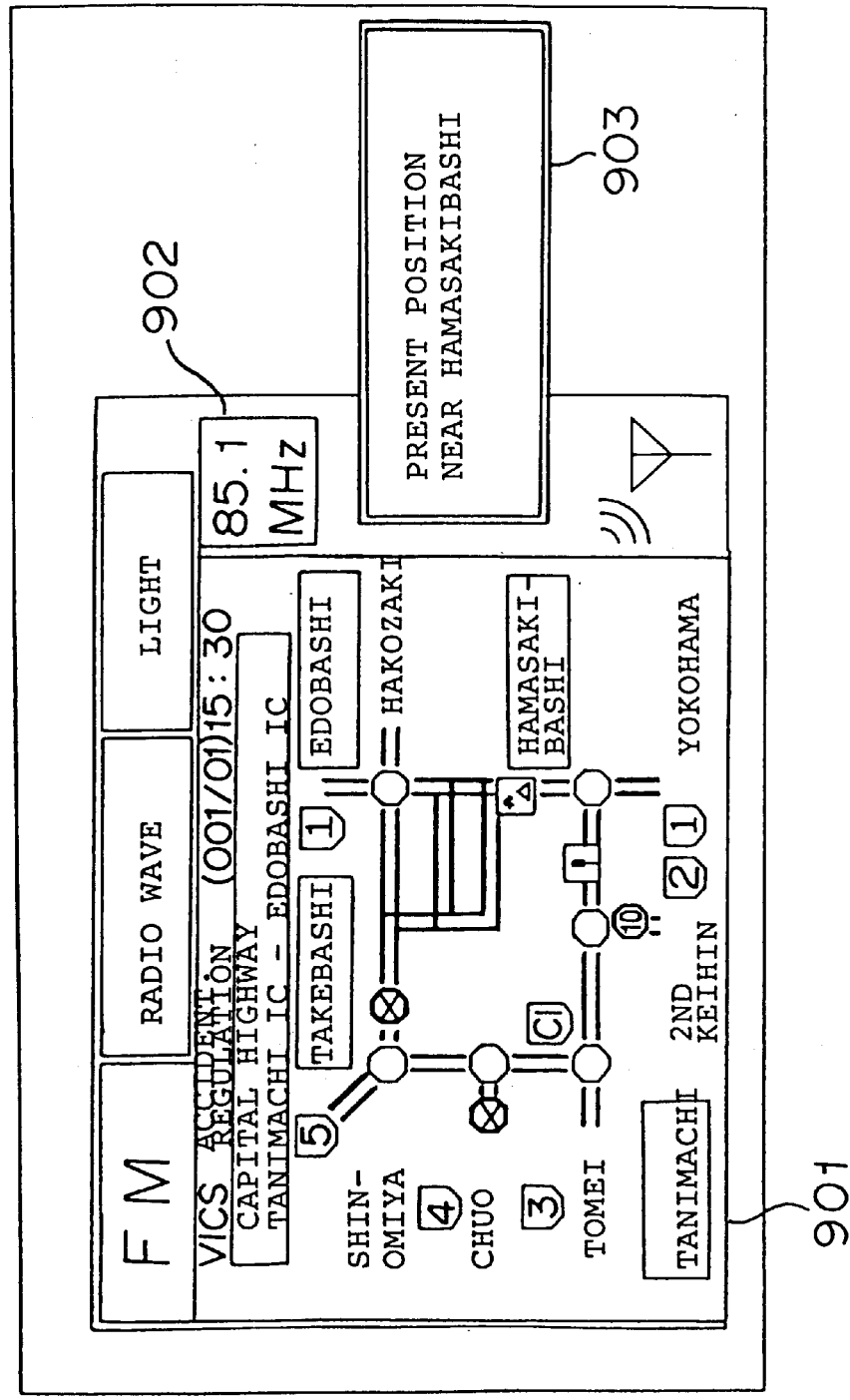
FIG. 9 is a diagram showing an example of the display region of the display means in the vehicle information display apparatus according to the first embodiment of the present invention.
Figure 10:
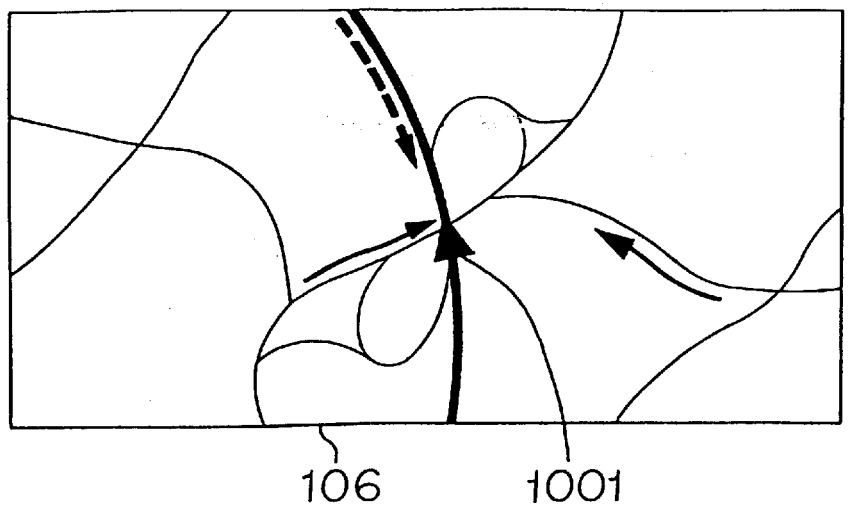
FIG. 10 is a diagram showing an example of the display region of the display means in the vehicle information display apparatus according to the first embodiment of the present invention.
Figure 11:
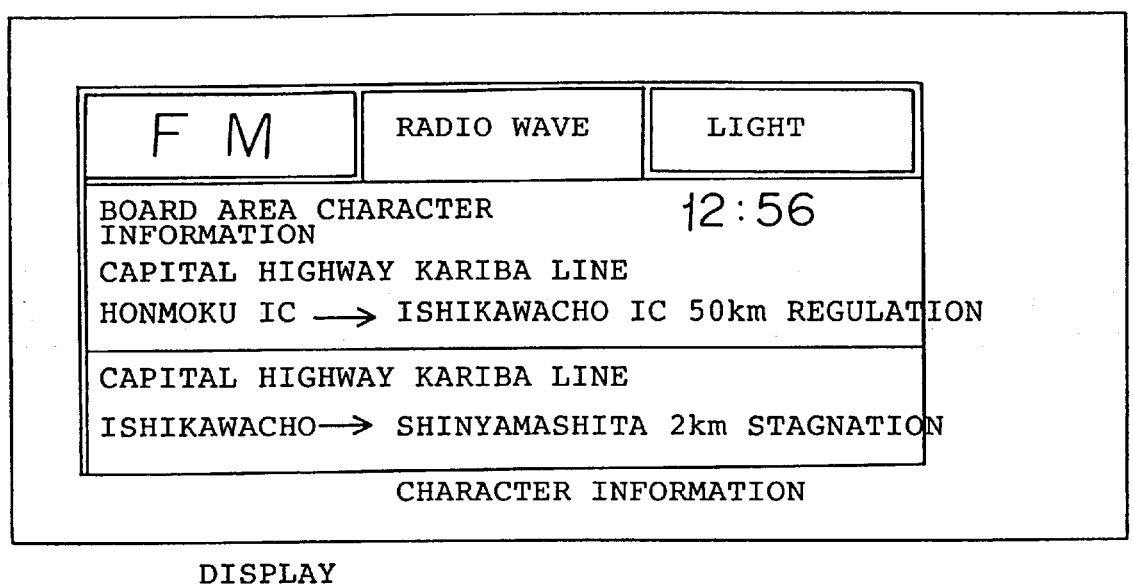
FIG. 11 is a diagram showing an example of the display region of a conventional vehicle information display apparatus.
Figure 12:
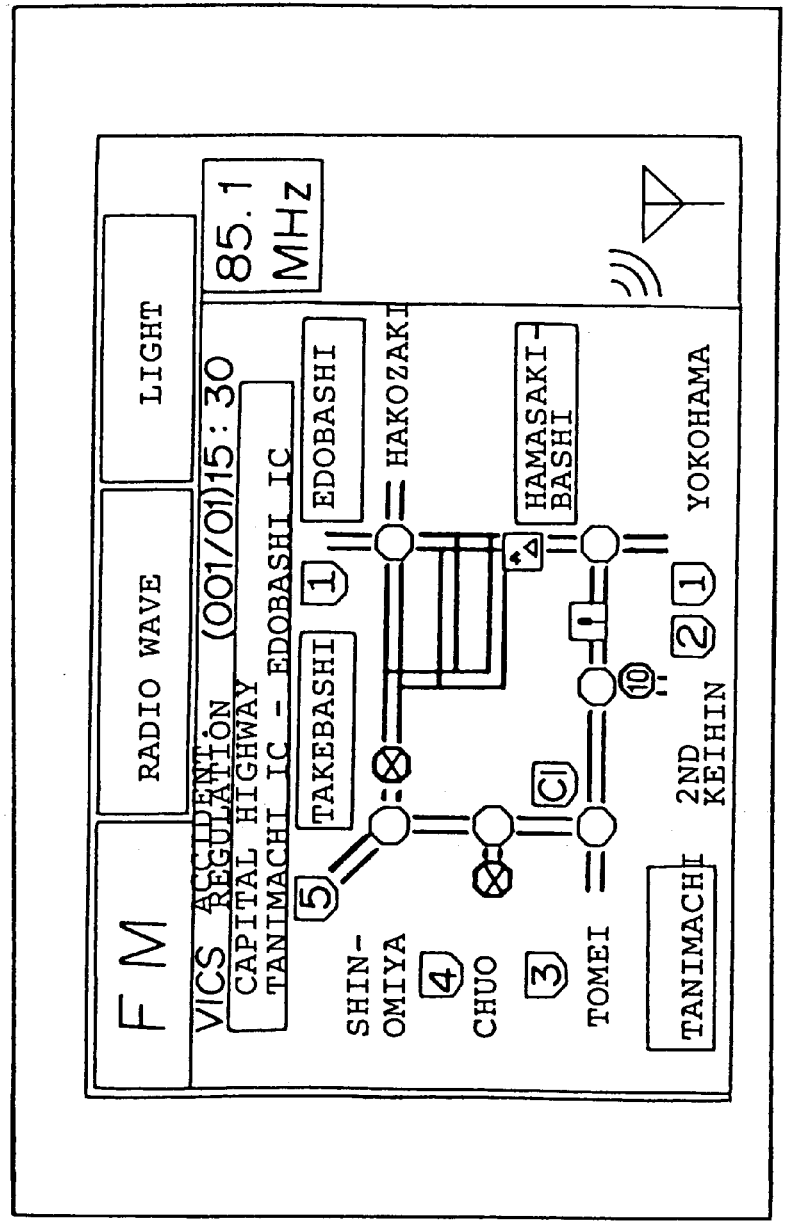
FIG. 12 is a diagram showing an example of the display region of the conventional vehicle information display apparatus.
Figure 13:
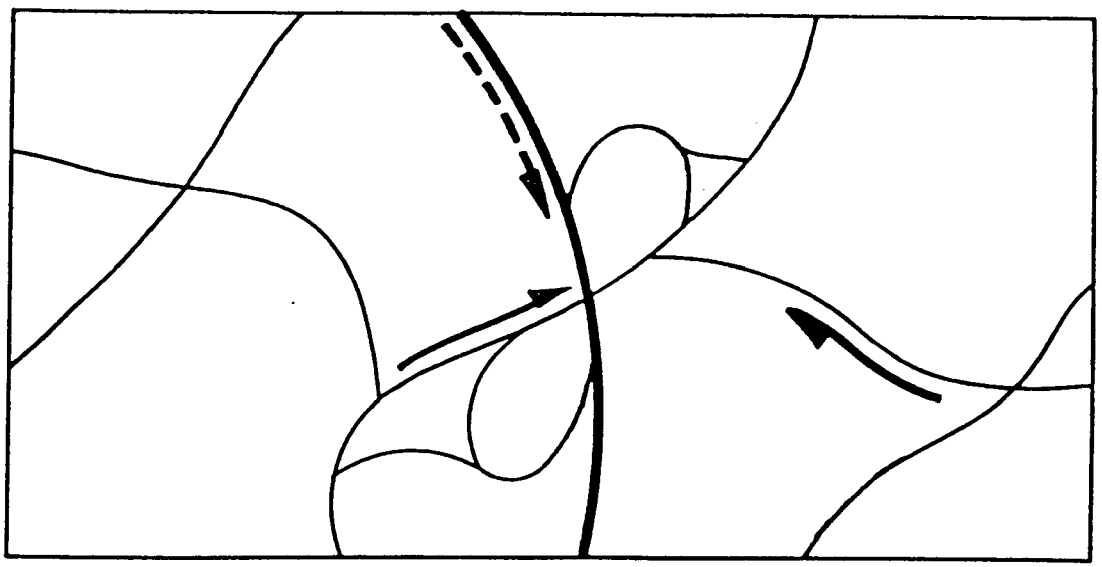
FIG. 13 is a diagram showing an example of the display region of the conventional vehicle information display apparatus.
Figure 14:
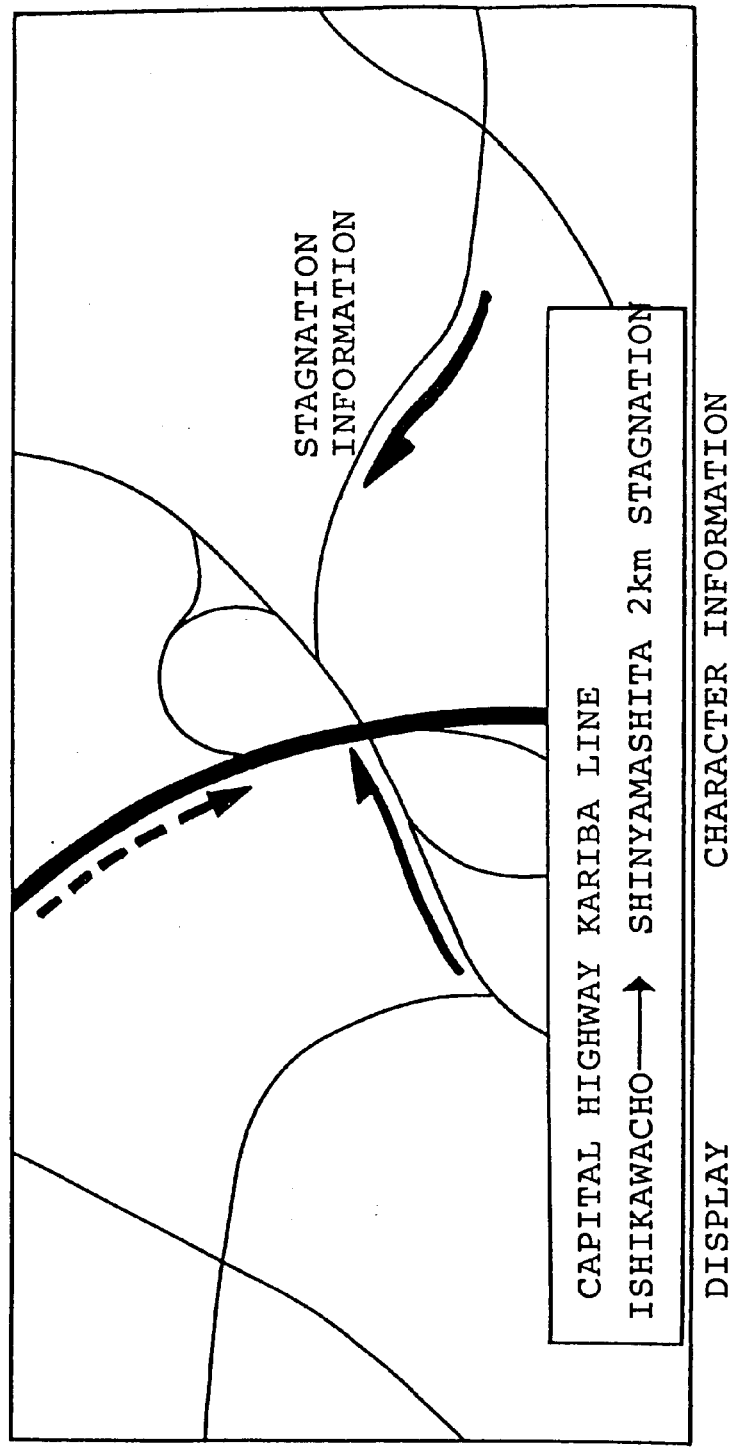
FIG. 14 is a diagram showing an example of the display region of the conventional vehicle information display apparatus.
Figure 15:
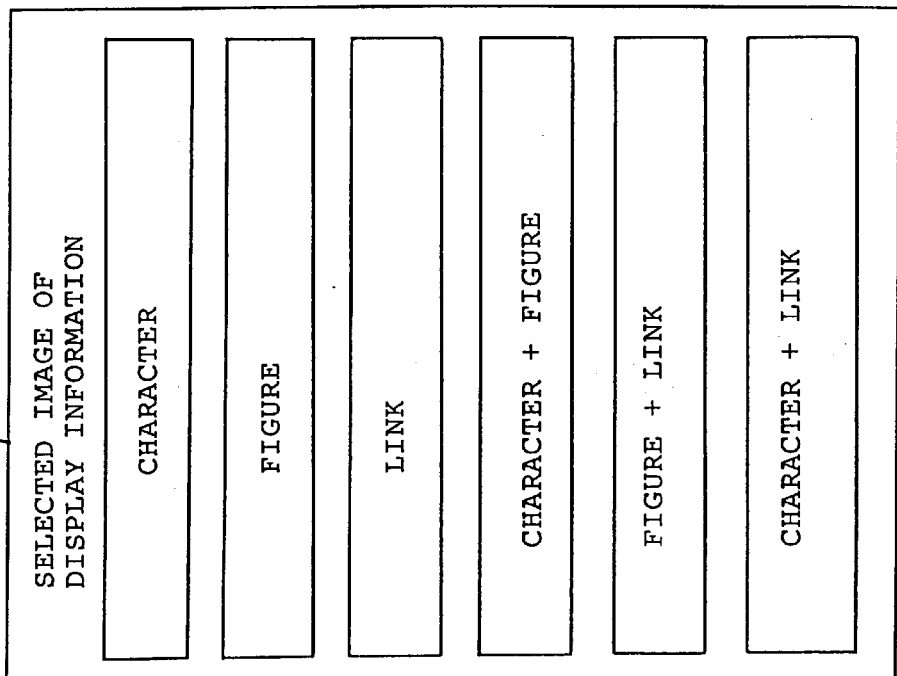
FIG. 15 is a diagram showing an example of a selected image of display information of the display means in the vehicle information display apparatus according to the first embodiment of the present invention.

In S304, determination is made whether or not plural kinds of vehicle information are to be displayed in combination. When the driver does not desire to display the plural kinds of vehicle information in combination, a single kind of vehicle information to be displayed is selectively inputted by means of the instruction inputting means 107 so that the operation proceeds to S305. When the driver desires to display the plural kinds of vehicle information in combination, any combination can be selectively inputted by the instruction inputting means 107. Then, the operation proceeds to S306, S307 or S308 depending on a combination inputted. Operations selectively inputted with respect to a kind of information to be displayed are conducted in view of a selection menu 310 (FIG. 15) displayed on the display region by using a touch switch or a remote controller. However, it is unnecessary to conduct the inputting operation when there is only one kind of information received. In S305, a single kind of vehicle information is displayed on the display region of the display means 106 as shown in FIGS. 8 to 10. This is the case that only one kind of vehicle information is received, or only one kind of vehicle information is selected among plural kinds of vehicle information received.

In the vehicle information display apparatus of the present invention, a vehicle information having the latest receiving time is displayed when the same and plural kinds of vehicle information are received by plural vehicle information receiving means 101 (the FM multiplex receiver, the radio beacon receiver and the optical beacon receiver and so on).

The diagrams shown in FIGS. 8 to 10 will be described.

FIG. 8 shows an image composed only of a character information wherein numeral 801 designates a window in which the character information is displayed which are sent from, for instance, a radio beacon. Numeral 802 designates a window in which the present position of the driver's own vehicle is indicated by characters wherein the present position detected by the present position detecting means 103 is compared with the road map data so that the present position is specified by a place name, a landmark, the name of a crossing, the name of a road or the like which is indicated on the display region. In this case, the control unit operates to find the marine tower near the present position and there is an indication of "near the marine tower".

In this case, wherein the present position is indicated by a place name, the name of a crossing, the name of an interchange of highway, the name of a road and so on which can easily be transmitted as the character information, the driver can easily understand the relation of the character information to the present invention.

FIG. 9 shows a figure information wherein numeral 901 designates a window in which a figure information obtained by the FM multiplex broadcasting is shown, and numeral 902 designates a frequency of signals for the figure information from an FM broadcast station, and numeral 903 designates a window in which the present position is shown by means of characters in the same manner as the before-mentioned window 802.

FIG. 10 shows that a received link information is displayed on a map by making the link information corresponding to the link data in the road map data wherein numeral 1001 designates a present position indicating mark.

Figure 4:
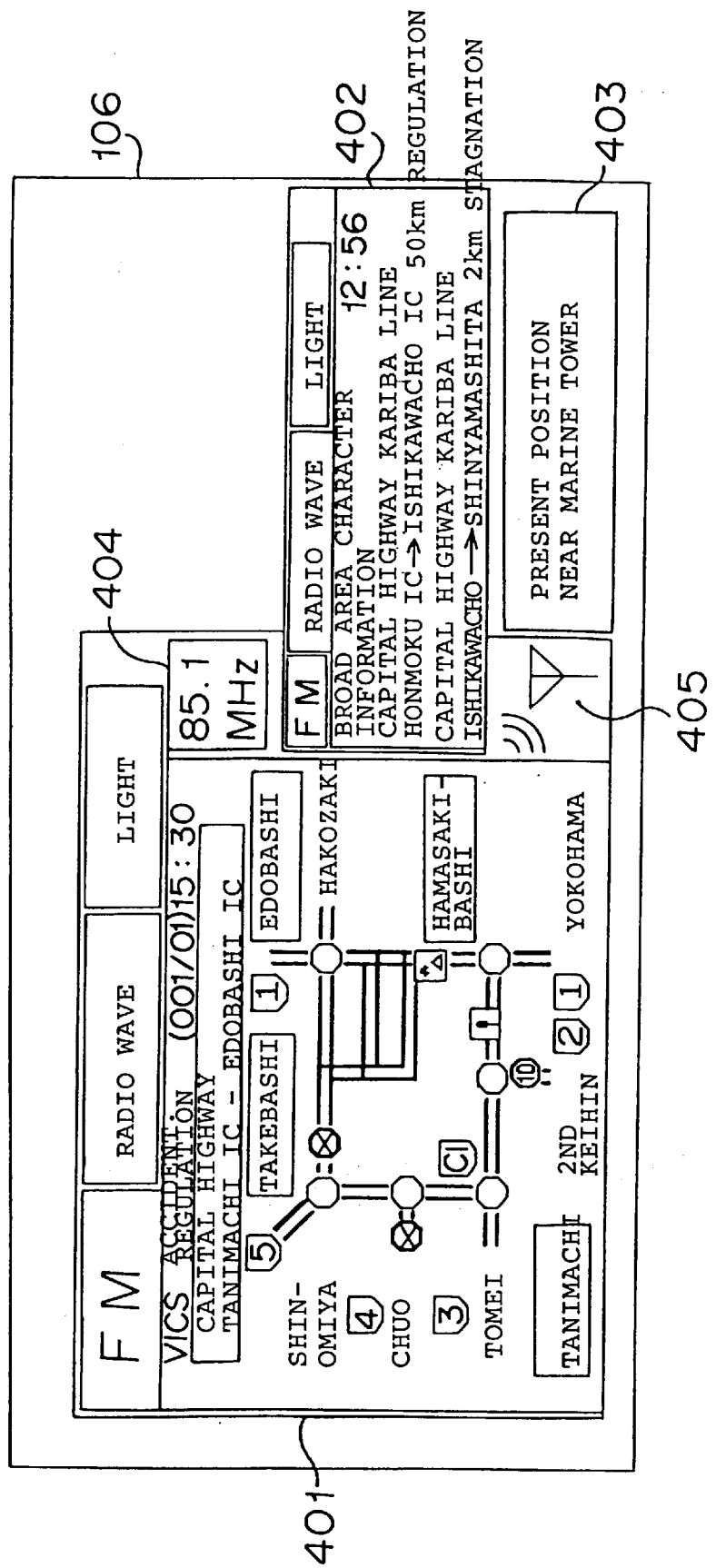
FIG. 4 is a diagram showing an example of the display region of a display means in the vehicle information display apparatus according to the first embodiment of the present invention.

On the other hand, in S306, a combination of the character information and the figure information is displayed on the display region of the display means 106 as shown in, for example, FIG. 4.

More detailed description will be made as to FIG. 4. Numeral 401 designates a window in which a figure information transmitted from the FM multiplex broadcasting station is shown. Numeral 402 designates a window in which a character information transmitted from the radio beacon is displayed. Numeral 403 designates a window in which the present position is displayed by using characters. Numeral 404 designates a frequency of signals for the figure information sent from an FM broadcasting station.

Figure 5:
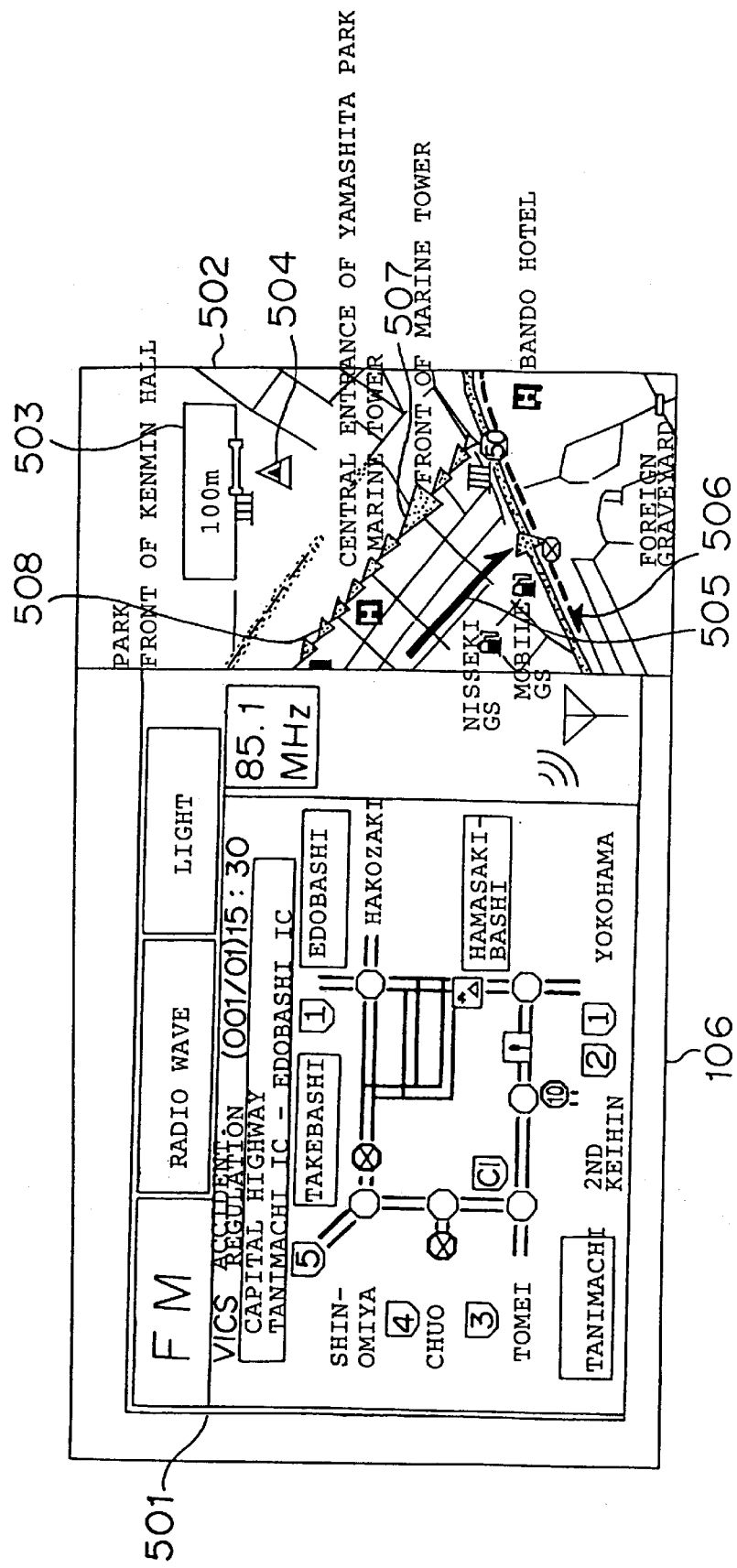
FIG. 5 is a diagram showing an example of the display region of the display means in the vehicle information display apparatus according to the first embodiment of the present invention.

In S307, a combination of the figure information and the link information is displayed as shown in FIG. 5.

Here, description will be made as to FIG. 5. Reference numeral 501 designates a window in which a figure information is shown based on signals from the FM multiplex broadcasting in the same manner as the before-mentioned window 401, and numeral 502 designates a window in which information such as a traffic stagnation, a traffic accident, or road closed is shown on a displayed map by making a link information from the FM multiplex broadcasting correspondent to the link data in the road map data. Numeral 503 designates a mark indicating a reduced scale of the map, which is shown in the upper portion of window 502, and numeral 504 designates a mark indicating the azimuth. Numerals 505 and 506 designate marks in an arrow shape which are based on a stagnation information obtained from the link information and which is shown at a side of the road in a stagnant state. The mark 505 is indicated by a solid line, and the mark 506 is indicated by a dotted line whereby a degree of stagnation is presented. The mark 505 indicated by a solid line means a more severe state of stagnation (namely, it takes much time to pass the road). The direction of the arrow marks indicates a direction into which the driver's own vehicle runs in the stagnant road. Numeral 507 designates a mark indicating the present position, and numeral 508 designates a mark for guiding the vehicle to the destination.

Figure 6:
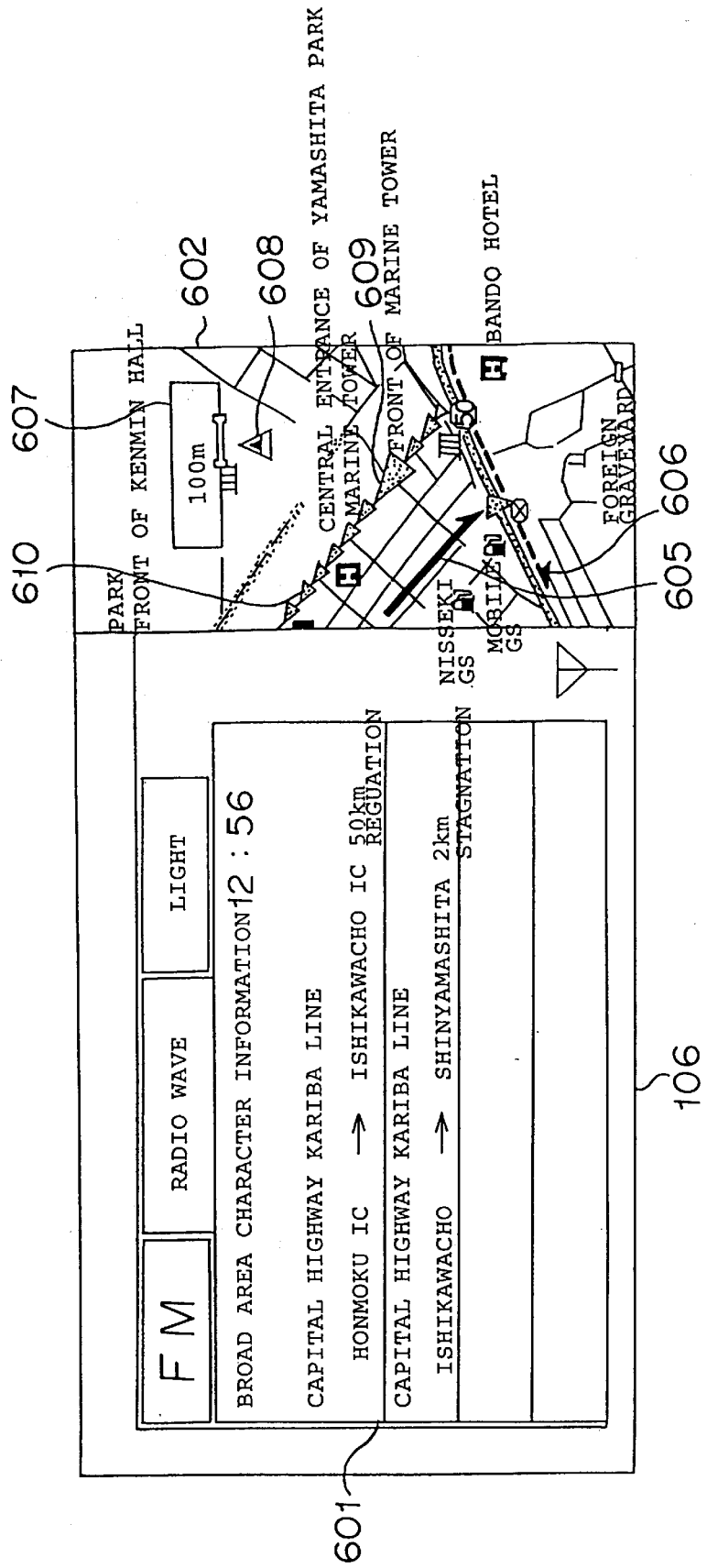
FIG. 6 is a diagram showing an example of the display region of the display means in the vehicle information display apparatus according to the first embodiment of the present invention.

Returning to FIG. 3, in S308, a display is in combination of a character information and a link information as shown in, for example, FIG. 6.

Here, description will be made as to FIG. 6. Numeral 601 designates a window in which a character information sent from a radio beacon is displayed, and numeral 602 designates a window in which information such as traffic stagnation, accident, road closing and so on is displayed on a displayed map by making a link information from the FM multiplex broadcasting correspondent to the link data in the road map data in the same manner as the before-mentioned window 502. Numeral 607 designates a mark indicating a reduced scale of the map, and numeral 608 designates a mark indicating the azimuth. Numerals 605 and 606 are respectively marks having an arrow shape which are shown based on a stagnation information obtained from the link information, the marks being indicated at a side of the road in a stagnant state. The mark 605 is shown by a solid line and the mark 606 is shown by a dotted line whereby a degree of stagnation is shown. The mark 605 shown by the solid line means a severe state of stagnation (namely, it takes much time to pass the stagnant road). The direction of the arrow mark indicates a direction into which the driver's own vehicle runs in the stagnant road. Numeral 609 designates a mark indicating the present position, and numeral 610 designates a mark for guiding the vehicle to the destination.

Thus, according to the present invention, plural kinds of vehicle information can be displayed in combination as in S306, S307 and S308.

In the first embodiment, when the same kind of vehicle information is received from a plurality of vehicle information receiving means 101, the information having the latest signal receiving time is displayed. However, it is possible to display the vehicle information having the latest signal presenting time among a plurality of information presenting time for the vehicle information data. Further, it is possible to select one of the plurality of vehicle information receiving means for displaying information when the information is to be displayed.

Further, the first embodiment is so adapted that when a single kind of vehicle information is received, the received kind of vehicle information is displayed. However, it is possible to so construct that a plurality of memories are provided to store various kinds of vehicle information so that a vehicle information in the past is maintained, and the vehicle information received in the past is displayed in combination with the present vehicle information even when a vehicle information received at present is a single.

Further, in the first embodiment, use of a wide display (a display region having an aspect ratio of 16:9) can be exemplified as the display means 106. However, a display of desired size such as a normal display (a display region having an aspect ration of 4:3) may be used by suitably arranging windows in combination.

A second embodiment of the present invention will be described.

In the above-mentioned first embodiment, a display is so made as to be in combination of plural kinds of vehicle information received. In the second embodiment, however, when a figure information is received for displaying, a mark indicating the present position is put in the displayed figure information so that the driver can easily recognize the present position.

Figure 7:
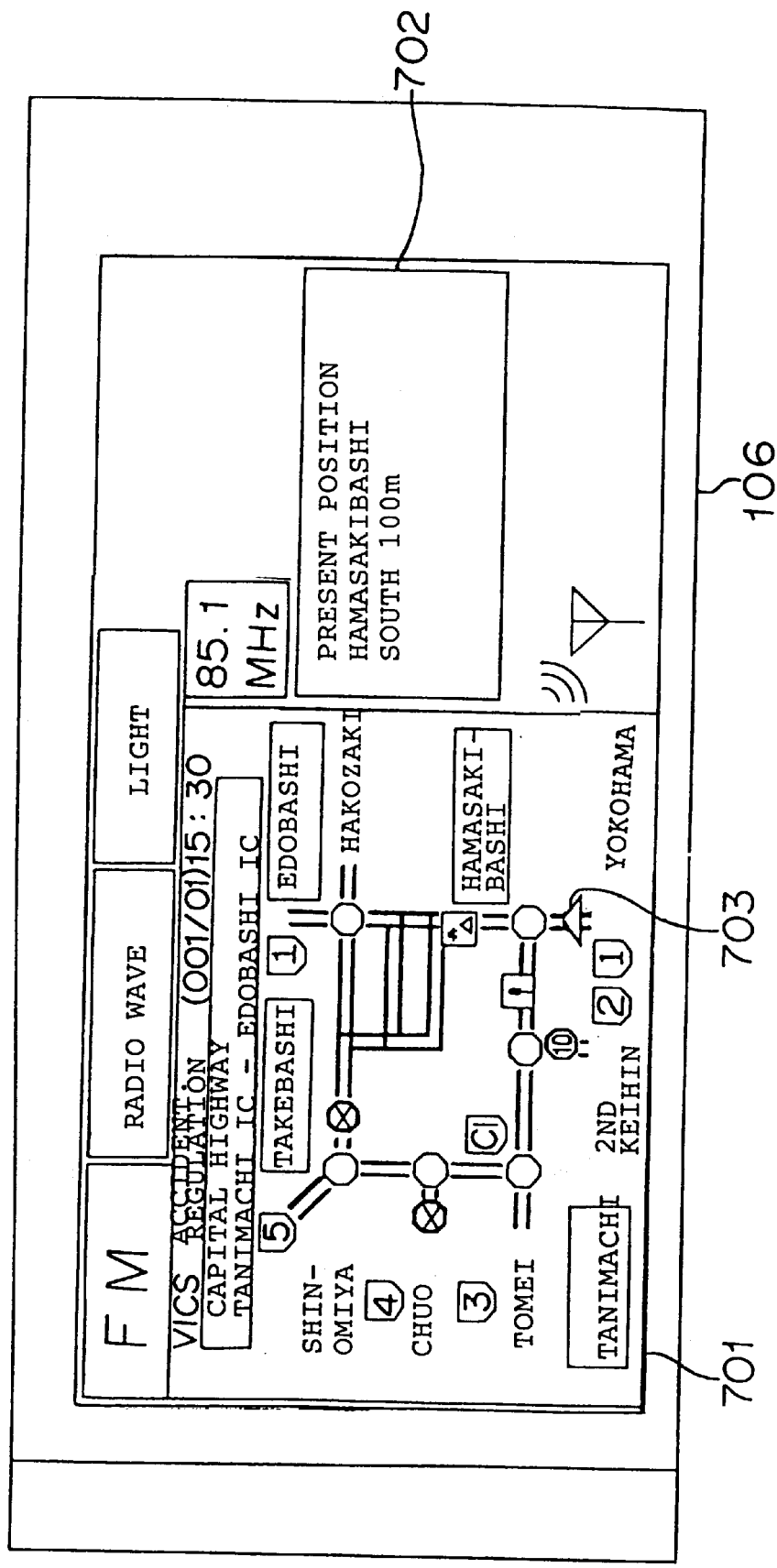
FIG. 7 is a diagram showing an example of the display region of a display means in a vehicle information display apparatus according to a second embodiment of the present invention.

FIG. 7 shows a display region of the display means 106 in which a simplified map is shown based on a figure information. In FIG. 7, numeral 701 designates a window for displaying the received figure information, and numeral 702 designates a window superimposed on the window 701, in which place names, road names at or near the present position are shown. The display means 106 displays a notorious place and a distance therefrom, in particular, a place name and the name of a crossing shown in the simplified map based on the figure information and a distance therefrom. Numeral 703 designates a mark indicating the present position presented on the simplified map based on the figure information. In this case, since the figure information is transmitted as the image data, it is difficult to judge the position on the image data corresponding to the present position based only on the image data. However, the figure information is composed of a background data wherein roads and place names are shown as a background figure and super-imposition data which is for superimposing a vehicle information on the background data. Accordingly, it is possible to operate the position of each place on the displayed image with respect to the background data and to store the operated position along with the information concerning the kinds of the background figures, whereby the present position can be displayed as shown in FIG. 7.

In the above-mentioned embodiments, description is concentrated to the present position of the driver's own vehicle.

However, the vehicle information display apparatus of the present invention can be used for indicating another place or area such as a destination depending on user's needs. For example, it is possible to display a figure information and a map around a destination in combination, or a figure information or a character information and characters such as a place name, the name of a building and so on indicating a destination in combination.

Further, the above-mentioned embodiments may be provided with a MCA radio, a telephone, a satellite broadcasting as the vehicle information receiving means.

In accordance with an aspect of the present invention, when a vehicle information based on image data is received, the present position is displayed by means of characters, or is displayed on a map so that a user can recognize the present position. Accordingly, the user can consider the vehicle information based on image data and the present position so that the vehicle information can easily be understood.

In accordance with another aspect of the present invention, a vehicle information based on image data is displayed in a part of a display region and a map is displayed in another part to indicate the present position. Accordingly, a user can consider the vehicle information based on image data, the present position and neighboring locations thereof so that the user can easily understand the vehicle information.

In accordance with another aspect of the present invention, when a vehicle information based on a character data is received, the present position is displayed by means of characters so that a user can recognize the name of place at the present position. Accordingly, the user can consider the name of places in the vehicle information based on the character data and the name of the present position so that the user can easily understand the vehicle information.

In accordance with another aspect of the present invention, it is possible to display the present position on a simplified map which is presented according to a vehicle information based on image data. Accordingly, a user can consider the present position and the vehicle information on the simplified map so that he can easily understand the vehicle information.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle information display apparatus which comprises:
   a vehicle information receiving means for receiving vehicle information indicating a condition other than vehicle position, said vehicle information receiving means operable to receive said vehicle information in the form of image data, character data, and link data,
   a present position detecting means for detecting the present position of a driver's own vehicle,
   a display means for displaying information, and
   a control means which is so adapted that when the vehicle information receiving means receives a vehicle information in the form of image data, the vehicle information in the form of image data is displayed, and the present position of the driver's own vehicle is displayed in the form of characters or a present position indicating mark on a displayed map;
   wherein plural kinds of vehicle information are received by different vehicle information receiving means; and
   wherein the different vehicle information receiving means are an FM multiplex signal receiver, a radiowave beacon receiver and an optical beacon receiver.

2. A vehicle information display apparatus which comprises:
   a vehicle information receiving means for receiving vehicle information indicating a condition other than vehicle position, said vehicle information receiving means operable to receive said vehicle information in the form of image data, character data, and link data,
   a present position detecting means for detecting the present position of a driver's own vehicle,
   a display means for displaying information, and
   a control means which is so adapted that when the vehicle information receiving means receives a vehicle information in the form of image data, the vehicle information in the form of image data is displayed, and the present position of the driver's own vehicle is displayed in the form of characters or a present position indicating mark on a displayed map;
   wherein the display means which is so adapted that when the vehicle information receiving means receives a vehicle information based on image data, the vehicle information based on image data is displayed on a part of a display region and a map is displayed on another part of the display region, and the present position of the driver's own vehicle detected by the present position detecting means is displayed on the map;
   wherein plural kinds of vehicle information are received by different vehicle information receiving means; and
   wherein the different vehicle information receiving means are an FM multiplex signal receiver, a radiowave beacon receiver and an optical beacon receiver.

3. A vehicle information display device which comprises:
   a vehicle information receiving means for receiving vehicle information indicating a condition other than vehicle position information, said vehicle information receiving means operable to receive said vehicle information in the form of image data, character data, and link data,
   a present position detecting means for detecting the present position of a driver's own vehicle,
   a display means for displaying information, and
   a control means which is so adapted that when the vehicle information receiving means receives a vehicle information in the form of character data, the vehicle information in the form of character data is displayed, and the present position of the driver's own vehicle is displayed in the form of characters;
   wherein plural kinds of vehicle information are received by different vehicle information receiving means; and
   wherein the different vehicle information receiving means are an FM amplifier signal receiver, a radiowave beacon receiver and an optical beacon receiver.

4. A vehicle guidance apparatus comprising:
   a vehicle information receiver operable to receive status information indicating a condition other than vehicle position said vehicle information receiver operable to receive said status information in the form of image data, character data, and link data, and,
   a present position detector operable to detect the present position of a driver's own vehicle
   wherein the guidance apparatus is operable to output to the driver positional and guidance information as well as status information indicating a condition other than the vehicle's position or guidance, and wherein the form of the received status information is used by said guidance apparatus to determine the form of the positional, guidance, and status information that is output to the driver.

5. The vehicle guidance apparatus according to claim 4, wherein the status information is a traffic status.

6. The vehicle guidance apparatus according to claim 4, wherein the status information is an indication as to whether there is a traffic accident.

7. The vehicle guidance apparatus according to claim 4, wherein the status information is an indication as to whether a road is closed.

8. The vehicle guidance apparatus according to claim 4, wherein the status information is status information transmitted on a different carrier than position and guidance information.

9. The vehicle guidance apparatus according to claim 8, wherein the status information is transmitted by FM multiplex broadcasting.

10. The vehicle guidance apparatus according to claim 9, wherein the status information is transmitted by mobile telephone.

11. A vehicle information display apparatus which comprises:
- a vehicle information receiver that receives vehicle information indicating a condition other than vehicle position, said vehicle information receiver receives said vehicle information in the form of image data,
- a present position detector that detects the present position of a driver's own vehicle,
- a display that displays information, and
- a controller which is so adapted that when the vehicle information receiver receives a vehicle information in the form of image data, the vehicle information in the form of image data is displayed, and the present position of the driver's own vehicle is displayed in the form of characters or a present position indicating mark on a displayed map;
- wherein plural kinds of vehicle information are received by different vehicle information receivers; and
- wherein the different vehicle information receiver are an FM multiplex signal receiver, a radiowave beacon receiver and an optical beacon receiver.

12. A vehicle information display apparatus which comprises:
- a vehicle information receiver that receives vehicle information indicating a condition other than vehicle position, said vehicle information receiver receives said vehicle information in the form of image data,
- a present position detector that detects the present position of a driver's own vehicle,
- a display that displays information, and
- a controller which is so adapted that when the vehicle information receiver receives a vehicle information in the form of image data, the vehicle information in the form of image data is displayed, and the present position of the driver's own vehicle is displayed in the form of characters or a present position indicating mark on a displayed map;
- wherein the display which is so adapted that when the vehicle information receiver receives a vehicle information based on image data, the vehicle information based on image data is displayed on a part of a display region and a map is displayed on another part of the display region, and the present position of the driver's own vehicle detected by the present position detector is displayed on the map;
- wherein plural kinds of vehicle information are received by different vehicle information receiver; and
- wherein the different vehicle information receiver are an FM multiplex signal receiver, a radiowave beacon receiver and an optical beacon receiver.

13. A vehicle information display device which comprises:
- a vehicle information receiver that receives vehicle information indicating a condition other than vehicle position information, said vehicle information receiver operable to receive said vehicle information in the form of character data,
- a present position detector that detects the present position of a driver's own vehicle,
- a display that displays information, and
- a controller which is so adapted that when the vehicle information receiver receives a vehicle information in the form of character data, the vehicle information in the form of character data is displayed, and the present position of the driver's own vehicle is displayed in the form of characters;
- wherein plural kinds of vehicle information are received by different vehicle information receivers; and
- wherein the different vehicle information receiver are an FM multiplex signal receiver, a radiowave beacon receiver and an optical beacon receiver.

* * * * *